United States Patent [19]

Ladov

[11] 3,926,819
[45] Dec. 16, 1975

[54] LIQUID LUBRICANTS CONTAINING CRYSTALLINE SULFUR AND A SULFURIZED FAT

[75] Inventor: Edwin N. Ladov, Cherry Hill, N.J.

[73] Assignee: Mobil Oil Corporation, New York, N.Y.

[22] Filed: Oct. 29, 1974

[21] Appl. No.: 518,312

Related U.S. Application Data

[63] Continuation-in-part of Ser. No. 343,612, March 21, 1973, abandoned.

[52] U.S. Cl. ..................... 252/31; 72/42; 252/48.6
[51] Int. Cl.$^2$. C10M 3/06; C10M 1/38; C10M 3/32; C10M 5/28
[58] Field of Search ................. 252/31, 48.6; 72/42

[56] References Cited
FOREIGN PATENTS OR APPLICATIONS
557,756  12/1943  United Kingdom................... 252/31

Primary Examiner—Delbert E. Gantz
Assistant Examiner—I. Vaughn
Attorney, Agent, or Firm—Charles A. Huggett; Raymond W. Barclay; Benjamin I. Kaufman

[57] ABSTRACT

Liquid lubricant compositions are provided containing minor amounts of crystalline sulfur and a sulfurized fat as a dispersing agent. A process is also provided for preparing these compositions by heating amorphous sulfur to the crystalline hydrocarbon-soluble form and incorporating crystalline sulfur thus produced into liquid lubricant compositions in the presence of a dispersing agent comprising a sulfurized fat.

10 Claims, No Drawings

LIQUID LUBRICANTS CONTAINING CRYSTALLINE SULFUR AND A SULFURIZED FAT

CROSS-REFERENCE TO RELATED APPLICATIONS

Continuation-in-part of application Ser. No. 343,612 filed Mar. 21, 1973 and now abandoned.

BACKGROUND OF THE INVENTION

1. Field of the invention

This invention relates to liquid lubricant compositions and, in one of its aspects, relates more particularly to liquid hydrocarbon compositions containing sulfur, which serves as an extreme pressure agent. Still more particularly, in this aspect, the invention relates to liquid hydrocarbon compositions containing sulfur as an extreme pressure agent and which do not undergo color change normally caused by the presence of sulfur. 2. Description of the prior art Sulfur has heretofore been introduced into liquid hydrocarbon compositions to serve as an extreme pressure additive. In this respect, it has been found that difficulty is encountered in attempting to incorporate amorphous sulfur into these compositions, by reason of its poor solubility. It is also known however, that amorphous sulfur can be subjected to heat for conversion to the crystalline form, the latter being more readily soluble in liquid hydrocarbons. In this respect, however, it has also been found that crystalline sulfur exhibits a tendency to precipitate out of the liquid hydrocarbon on cooling, and, furthermore, heating the sulfur above its melting point is found to cause undesirable color change in the liquid hydrocarbon composition being treated and emission of odor due to hydrogen sulfide formation. Thus, it is apparent that it is highly desirable to provide a process wherein sulfur in crystalline form can be successfully incorporated in liquid hydrocarbon compositions without resulting in ultimate precipitation of the sulfur and without causing objectionable color change or odor in such compositions.

SUMMARY OF THE INVENTION

In accordance with the present invention, it has now been found, as more fully hereinafter described, that the aforementioned objectionable precipitation of sulfur and color change can be successfully avoided in the treatment of liquid lubricant compositions by heating amorphous sulfur below its melting point (viz. from about 210°F. to about 220°F.) to the crystalline hydrocarbonsoluble form and incorporating crystalline sulfur thus produced into the lubricant composition in the presence of a dispersing agent comprising a sulfurized fat. Following formulation of the liquid lubricant, crystalline sulfur and sulfurized fat, the resulting mixture is then heated to a temperature from about 180°F. to about 220°F. until all of the sulfur has been dissolved.

It is found that by heating the amorphous sulfur above its melting point, color degradation of the liquid hydrocarbon ensues with an increased emission of hydrogen sulfide, giving rise to problems of pollution. Hence, it will be apparent that the conversion of the amorphous sulfur to the crystalline form should be carried out at the aforementioned designated temperature of from about 210°F. to about 220°F., to avoid color degradation and pollution. More specifically, in accordance with the invention, sulfurized oils are provided containing a major proportion of a liquid lubricant, between about 0.1 and about 5% by weight, of crystalline sulfur and a sufficient amount of a sulfurized fat to effectively disperse the crystalline sulfur in the liquid lubricant, the sulfur being introduced in the lubricant in the presence of the sulfurized fat at a temperature within the range of about 180°F to about 220°F and the resulting mixture being maintained at this temperature range until substantially complete dissolution of the sulfur has occurred.

The liquid lubricant component of the novel composition may comprise any liquid lubricant which is normally capable of exhibiting improved extreme pressure properties by reason of the presence of sulfur. Thus, the liquid lubricant compound may comprise mineral oils, paraffinic mineral oils. synthetic oils and, generally, oils of lubricating viscosity.

Representative examples of the above-described liquid lubricants include mineral oils or synthetic oils of wide varieties and types normally employed in the manufacture of lubricating oils and grease compositions in which these oils are employed as vehicles in conjunction with thickening agents.

Thus, mineral oils having a viscosity of at least 40 SUS at 100°F., and particularly those falling within the range from about 60 SUS to about 6,000 SUS at 100°F. may be employed. In instances, where synthetic oils are employed rather than mineral oils, or in combination therewith, various compounds of this type may be successfully utilized. Typical synthetic oils include: polypropylene glycol, trimethylol propane esters, neopentyl and pentaerythritol esters, di-(2-ethyl hexyl) sebacate, di-(2-ethyl hexyl) adipate, di-butyl phthalate, fluorocarbons, silicate esters, silanes, esters of phosphorus-containing acids, liquid ureas, ferrocene derivatives, hydrogenated mineral oils, chain-type polyphenyls, siloxanes and silicones (poly-siloxanes), alkyl-substituted diphenyl ethers typified by a butyl-substituted bis (p-phenoxy phenyl) ether, phenoxy phenyl ethers, etc. If so desired, additional additive materials such as stabilizers, antioxidants, anti-wear agents and other extreme pressure agents commonly employed in lubricant formulations may be added to form the final liquid lubricant product.

The sulfurized fat component of the novel composition, functioning as a dispersing agent, may comprise any material which is conventionally designated as a "sulfurized fat" capable of keeping the crystalline sulfur in solution, and generally prepared by reacting sulfur with a fatty acid, ester or alcohol at elevated temperature. In this respect, it is found that simply adding the sulfur to an oil of lubricating viscosity does not produce an acceptable oil lubricant, e.g., in the preparation of cutting oils. The sulfur component must remain in solution even at relatively low temperatures. For example, a 150 SUS solvent-refined paraffinic-neutral oil derived from a low sulfur (0.3 wt.%) Mid-continent crude oil can hold only 0.4 wt.% sulfur in solution at 40°F. The use of sulfurized fats, however, have been found to increase this solubility to about 0.7 wt.% sulfur, by acting as dispersants. In general, it is noted that the use of sulfurized fats produces a stable solution which can contain as much as 100% more sulfur than is normally soluble in paraffin oils. Without the presence of this dispersant, sulfur would precipitate from the oil during low-temperature storage (40°F).

DESCRIPTION OF SPECIFIC EMBODIMENTS

A typical sulfurized oil, prepared in accordance with the present invention is formulated and prepared as follows:

(1) Formulation

| | Wt.% |
|---|---|
| Crystalline sulfur | 0.68 |
| Corrosive (stains copper) sulfurized fat | 0.30 |
| 300 SUS solvent refined paraffinic neutral mineral oil | 34.96 (34.7 vol.%) |
| 100 SUS solvent refined paraffinic neutral mineral oil | 64.06 (67.74 vol.%) |
| Color, ASTM max | 3.5 |

2. Manufacturing Procedure

The sulfur component is heated to a temperature between about 210°F. and about 220°F. for a period of not less than about 48 hours, sufficient to convert any oil insoluble sulfur to the oil-soluble crystalline allotrope. Under agitation, the sulfur, sulfurized fat and the oil are charged to a kettle and then heated to a temperature from about 180°F. to about 220°F. for a period of approximately one hour, or until all of the sulfur is dissolved. The resulting sulfurized oil is now ready for use. This finished product was found to exhibit no sulfur dropout at 40°F. and no perceptible color change.

With respect to the preparation of the novel liquid lubricant compositions of the present invention, and particularly with reference to the sulfurized fat component, it has been also found that the corrosive sulfurized fats (i.e., those fats that normally will stain copper), are much more effective, as dispersants for the sulfur, than sulfurized fats of the noncorrosive types.

As hereinbefore indicated, the sulfur introduced into the lubricant, in the presence of the sulfurized fat, is maintained at a critical temperature within the range of from about 180°F. to about 220°F., and the resulting mixture is maintained at this temperature range until substantially complete dissolution of the sulfur has occurred. It is found, however, that temperatures above about 220°F. result in a highly colored product and copious evolution of hydrogen sulfide, particularly in instances as disclosed by the prior art where temperatures on the order of 320°F. and higher are employed. The use of the aforementioned temperature range from about 180°F to about 220°F. results in a lighter colored product with no loss in active sulfur. Whatever quantity of sulfur is introduced into the mixture remains without formation of hydrogen sulfide. This avoidance of a product of dark color and sulfurous odor is highly significant, from a commercial standpoint, particularly in avoiding the cost of providing equipment for recovering hydrogen sulfide.

The sulfurized liquid lubricant compositions of the present invention, as hereinbefore indicated, comprise a light-colored low odor sulfurized oil containing a small amount of sulfuried fat. From a practical standpoint, in order to maintain these characteristics, the blending tank and transfer lines must be clear of any possible contaminants. In order to successfully sulfurize oil, the sulfur must be added slowly to a well-agitated kettle. Sulfur predispersion is highly desirable, if possible. These precautions will keep the sulfur from lumping and facilitate its dissolution. The kettle employed for sulfurization, as well as all transfer lines, desirably are flushed thoroughly with the base liquid lubricant for example, a solvent-refined paraffinic oil. Such procedure eliminates undesirable contaminants which can cause both color and odor problems in the finished product.

The slow addition of the sulfur to the hot well-agitated oil containing a small amount of sulfurized fat is prefered, so that sulfur dissolves without settling to the bottom of the kettle. Sulfur predispersion is desirable, if possible.

Typical steps for conducting the blending, such as blending at a temperature of 190°F. to 210°F may comprise the following.

1. To the cleaned blending tank is added the 100 SUS mineral oil, or at least 65% of the total oil charge. Sufficient oil is employed to adequately cover the mixer impellers and thus achieve the best possible agitation.
2. Heating and agitating are next initiated and a recirculation system, if available can be employed for increasing agitation.
3. When the bulk oil temperature has reached 140°F. the sulfurized fat is added and the bulk oil temperature is raised to 190°–210°F.
4. When the bulk oil temperature has reached 190°F. the crystalline sulfur is added very slowly to the hot, agitated oil, as hereinbefore indicated. A 50 pound bag requires about 5 minutes addition time. If the sulfur is predispersed, the predispersion can be pumped into the hot agitated oil.
5. The oil temperature is now maintained at 190°–210°F. for a period of one hour and then the heat is turned off.
6. The remaining oil is added, viz. 300 SUS mineral oil, to the kettle. Such addition helps to cool the mixture.

As hereinbefore described, the sulfur in crystalline form introduced into the lubricant, in the presence of the sulfurized fat, is maintained at a critical temperature within the range of from about 180°F. to about 220°F and, as also hereinbefore indicated, temperatures above about 220°F. result in a highly colored product and copious evolution of hydrogen sulfide, particularly in instances as disclosed by the prior art, where temperatures on the order of 320°F. and higher are employed. To illustrate this criticality in employing temperatures above about 220°F., a sulfurized oil, typical of the prior art, was formulated and prepared as follows.

(1) Formulation

| | Wt.% |
|---|---|
| Crystalline Sulfur | 0.80 |
| Corrosive (stains copper) sulfurized fat | 0.50 |
| 100 SUS solvent refined paraffinic neutral mineral oil (4140% vol.) | 98.70 |
| 200 SUS solvent refined paraffinic neutral mineral oil (51.83% vol.) | |

2. Manufacturing Procedure

The oil blend is heated to a temperature of 325°–330°F. Thereafter the sulfur and the sulfurized fat, which have been slurried in a portion of the oil are added. The slurry tank is then flushed with a portion of the remaining oil and the entire mixture is maintained at a temperature from about 320 to about 330°F for a period of 1½ hours. The mixture is then recycled through the cooler to reduce the temperature to about 270°F. The resulting cooled mixture is then transferred to a blow tank through the cooler, and air is then blown through for a period of 1½ hours at a temperature from about 50° to about 170°F.

The characteristics of the above-described formulation in which an unsatisfactory high ASTM color and active sulfur rating is present, are shown in the following table.

| | |
|---|---|
| Gravity, °API | 29.5 |
| Flash point, °F (COC) | 400 |
| Pour point, °F., Max. | +25 |
| Viscosity, SUS 100°F. | 145/160 |
| Color, ASTM, Max. | 6 |
| Total Sulfur, % | 1.0 |
| Active Sulfur, % Min. | 0.6 |
| Sulfur Separation 40°F. Max. (Cycled 3 times in shaking machine, 40°F to 70°F.) | Trace |

The examples and comparative data of the following table illustrate the effect of a sulfurized fat on low temperature stability of an oil containing dissolved sulfur. The sulfurized fat was prepared by reacting a mixture comprising, by weight, 50% solvent refined 100 SUS at 100°F. paraffinic mineral oil and 50% of a choice white animal grease. This mixture was reacted with 10%, by weight, of elemental sulfur at 40°F. to produce the sulfurized fat.

The test employed in the examples of the aforementioned table was the well-known Cicero Shaker Test. This test involves subjecting 3 oz. of a sulfurized oil formulation in a tall form 4-oz. bottle to a slow rocking motion at 40°F. in the presence of two 6-penny iron nails for 24 hours, followed by warming to room temperature for 1 hour. Repeating this cycle three times without evidence of sulfur dropout is judged acceptable. The test simulates the motion expected when transporting bulk deliveries, particularly under cold-soak conditions.

| | Effect of Sulfurized Fat on Low Temperature Stability of Sulfur Dissolved in Oil | | | | |
|---|---|---|---|---|---|
| Example | 1 | 2 | 3 | 4 | 5 |
| Formulation, wt. % | | | | | |
| 150 SUS at 100°F. solvent refined paraffinic mineral oil | 99.3 | 99.1 | 99.0 | 98.8 | 98.7 |
| Corrosive sulfurized fat containing 10% wt. sulfur | 0 | 0.2 | 0.3 | 0.5 | 0.5 |
| Sulfur (crystalline) | 0.7 | 0.7 | 0.7 | 0.7 | 0.8 |
| Low temperature stability (3 cycles) | F | P | P | P | F |

P = Pass
F = Fail

From the comparative data and examples of the foregoing table, it will be apparent that due to the presence of the sulfurized fat dispersant, relatively large amounts of crystalline sulfur can be kept in suspension and that, simultaneously, the oil can pass the low temperature stability test. On the other hand, where the sulfurized fat dispersant is not present as in Example 1 or is present in insufficient amount, and relatively large amounts of crystalline sulfur are to be incorporated, as in Example 5 the oil fails to pass the low-temperature stability test.

From the foregoing description and comparative data, it will be apparent that the present invention provides improved liquid lubricant compositions, containing sulfur, in which a relatively large amount of sulfur can be effectively dispersed in the liquid lubricant medium, without undergoing precipitation and without color-change taking place.

While the invention has been described with reference to preferred procedures, compositions and components therefor, it will be understood by those skilled in the art that departure from the preferred embodiments can be effectively made and are within the scope of the invention.

I claim:

1. A sulfurized oil containing a major proportion of a liquid lubricant, between about 0.1 and about 5% by weight of crystalline sulfur and a sufficient amount of a sulfurized fat to effectively disperse the crystalline sulfur in the liquid lubricant, said sulfur being introduced into said liquid lubricant, in the presence of said sulfurized fat, at a temperature within the range of about 180°F. to about 220°F and the resulting mixture being maintained at said temperature until substantially complete dissolution of the sulfur has occurred.

2. A composition as defined in claim 1 wherein said liquid lubricant comprises a mineral oil.

3. A composition as defined in claim 1 wherein said liquid lubricant comprises a paraffinic mineral oil.

4. A composition as defined in claim 1 wherein said liquid lubricant comprises a synthetic oil.

5. A process for treating a liquid lubricant composition selected from the group consisting of oils of lubricating viscosity and greases thereof, which comprises heating amorphous sulfur to the crystalline hydrocarbon-soluble form and incorporating crystalline sulfur thus produced into said liquid lubricant composition at a temperature between about 180°F to about 220°F. in the presence of a dispersing agent comprising a sulfurized fat.

6. A process as defined in claim 5 wherein said amorphous sulfur is heated at a temperature from about 210°F to about 220°F. for a time sufficient to convert it to the crystalline hydrocarbon-soluble form.

7. A process as defined in claim 5 wherein said liquid composition, crystalline sulfur and sulfurized fat are heated at a temperature from about 190°F to about 210°F until all sulfur has been dissolved.

8. A process as defined in claim 5 wherein said liquid lubricant comprises a mineral oil.

9. A process as defined in claim 5 wherein said liquid lubricant comprises a paraffinic mineral oil.

10. A process as defined in claim 5 wherein said liquid lubricant comprises a synthetic oil.

* * * * *